United States Patent
Le et al.

(10) Patent No.: US 8,151,019 B1
(45) Date of Patent: Apr. 3, 2012

(54) ADAPTIVE NETWORK TRAFFIC SHAPER

(75) Inventors: Tuong Le, Howell, NJ (US); Brian F. Rossa, Philadelphia, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 406 days.

(21) Appl. No.: 12/107,428

(22) Filed: Apr. 22, 2008

(51) Int. Cl.
G06F 3/00 (2006.01)
G06F 5/00 (2006.01)

(52) U.S. Cl. ............................ 710/52; 710/15
(58) Field of Classification Search ............... 710/15, 710/52
See application file for complete search history.

(56) References Cited

U.S. PATENT DOCUMENTS

| | | | |
|---|---|---|---|
| 5,583,792 A * | 12/1996 | Li et al. ............... | 709/224 |
| 6,338,011 B1 | 1/2002 | Furst et al. | |
| 6,600,737 B1 | 7/2003 | Lai et al. | |
| 7,016,302 B1 | 3/2006 | Schramm et al. | |
| 7,061,860 B1 | 6/2006 | Calvignac et al. | |
| 7,136,360 B2 | 11/2006 | Voce et al. | |
| 7,136,602 B2 | 11/2006 | Umezawa | |
| 7,167,452 B2 | 1/2007 | Jameson et al. | |
| 7,868,814 B1 | 1/2011 | Bergman | |
| 2003/0218979 A1 | 11/2003 | Storry et al. | |
| 2005/0248480 A1 | 11/2005 | Butler et al. | |
| 2007/0002740 A1 | 1/2007 | Evans et al. | |
| 2007/0115848 A1 | 5/2007 | Chean et al. | |
| 2008/0018545 A1 | 1/2008 | Kaplan et al. | |

OTHER PUBLICATIONS

Van Jacobson (1995), "Congestion avoidance and control". In proceeding of ACM SIGCOMM, pp. 314-329, New York, NY: ACM press.
Q. K. Shao and H. G. Zhang (2002), "TCP performance over satellite link".
B. Y. Choi, (2002), "Adaptive random sampling for load change detection".
S. Ma and C. Ji (2001), "Modeling heterogeneous network traffic in wavelet domain". IEEE/ACM transactions on networking, 9(5).
M. Mandjes, I. Saniee, S. Stolyar and R. Schmidt (2000), "Load characterization, overload prediction and load anomaly prediction for VoIP". In proceeding of Allerton Conference.
P. Flandrin (1992), "Wavelet analysis and synthesis of fractional Brownian motion". Information Theory, IEEE Transaction, 38(2).
T. Hastie, R. Tibshirani, J. Friedmaa (2001), "The Elements of Statistical Learning". NY, NY:Springer Verlag. pp. 64, 66, 84, 95, 96, 482, 532, 536, 540, 551, 558, 559, 560, 569, 581, 659, 660, 671, 695, 745.
In the name of Pedersen, Richard N., U.S. Appl. No. 12/403,733, filed Mar. 13, 2009, entitled "Priority Delivery Apparatus and Method".

* cited by examiner

*Primary Examiner* — Chun-Kuan Lee
*Assistant Examiner* — Zachary K Huson
(74) *Attorney, Agent, or Firm* — Howard IP Law Group, PC

(57) ABSTRACT

A network traffic shaper adjusts the rate of data flowing from a packet source to a packet sink responsive to priority assigned to the packets pursuant to their ability to match a series of filters. Each packet is applied to a queue depending on its classification. The packets are read from each queue in accordance with a queue reading policy. Singular spectrum analysis of the traffic load produces a set of vectors that capture the spectral bases of the traffic state. These vectors are associated with the bandwidth demanded by the traffic, a relationship that is recorded in a queue/time/eigenvector/bandwidth/control table. Samples of the current network load are compared with previously recorded vector bases to reveal how similar the current traffic state is to previous traffic states, which in turn predicts the traffic's bandwidth needs for the immediate future. The queue reading regime is updated in response to this prediction.

18 Claims, 8 Drawing Sheets

| QUEUE # | SIZE |
|---|---|
| 1 | 1024 |
| 1 | 554 |
| 4 | 128 |
| 7 | 168 |
| 2 | 412 |
| 1 | 554 |
| 5 | 780 |
| 3 | 1492 |
| 3 | 1492 |
| 2 | 176 |
| • | |
| • | |
| • | |
| • | |

FIG. 3

| QUEUE # | TIME | LOAD (BYTES) |
|---|---|---|
| 1 | 0 | 1024 |
| 2 | 0 | 256 |
| 3 | 0 | 768 |
| • | • | • |
| • | • | • |
| • |   | • |
| M | 0 | 512 |
| 1 | 1 | 1024 |
| 2 | 1 | 348 |
| 3 | 1 | 756 |
| • | • | • |
| • | • | • |
| • |   | • |
| M | N | 996 |

FIG. 5

| QUEUE # | TIME | EIGENVECTOR | BANDWIDTH (kbps) | CONTROL |
|---|---|---|---|---|
| 1 | 0 | $U_1[0]$ | 1024 | FALSE |
| 2 | 0 | $U_2[0]$ | 256 | TRUE |
| 3 | 0 | $U_3[0]$ | 768 | FALSE |
| • | • | | • | • |
| • | • | | • | • |
| • | • | | • | • |
| M | 0 | $U_M[0]$ | 512 | FALSE |
| 1 | 1 | $U_1[1]$ | 1024 | FALSE |
| 2 | 1 | $U_2[1]$ | 348 | TRUE |
| 3 | 1 | $U_3[1]$ | 756 | TRUE |
| • | • | | • | • |
| • | • | | • | • |
| • | • | | • | • |
| M | N | | 996 | TRUE |

WHERE EACH $U_j[K]$ IS AN N-BY-N MATRIX OF REAL NUMBERS

*FIG. 8*

ADAPTIVE NETWORK TRAFFIC SHAPER

FIELD OF THE INVENTION

This invention relates to control of prioritized network traffic, and more particularly to adaptive network loading control.

BACKGROUND OF THE INVENTION

As communication network capacity continues to increase, so do the bandwidth requirements of contemporary networked applications. This demand fuels an on-going need for network quality of service (QoS) enhancements, particularly those that can accommodate applications with strict bandwidth, loss, and latency sensitivities. Traffic-shaping (TS) is often a reliable component of QoS strategies under these conditions, especially when there is a large discrepancy between available bandwidth and application demand. A traffic-shaper controls the amount of outbound traffic from one or more flows onto a bandwidth-limited network (e.g., from LAN to WAN) and is thus able to support the distribution of limited network resources according to human design. When this design includes reservation of bandwidth for a particular preferred flow, the traffic-shaper can not only guarantee that this minimum requirement is met, but can also constrain the preferred flow at some maximum usage so that other flows are not starved.

Consider the problem of maintaining high quality of service to a priority flow that has strict bandwidth requirements which may be either high or low, and whose transmission latency must be bounded. Network engineers face many challenges when designing for these constraints, especially in guaranteeing bandwidth for the priority flow. Error in estimating requirements can have serious consequences for a critical application, making an a priori "worst-case" analysis the only viable estimation process unless the priority application is itself QoS-aware. However, implementing network priority control using worst-case analysis can have significant impact on low-priority traffic. In particular, the estimated worst-case bandwidth requirement of the priority application may be orders of magnitude greater than what the application actually requires most of the time. The result of implementing the worst-case assumptions can be excessive resource reservation for the highest-priority flow and scarcity of resources for flows that compete with it. This scenario introduces disruption to potentially important network applications when their needs are "trumped" by those of the priority application.

FIG. 1 is a simplified block diagram of a portion 10 of a prior-art network communication system. In FIG. 1, portion 10 includes a traffic shaper 12. Traffic shaper 12 includes an IN interface 14 that typically faces a high-bandwidth data source such as a local area network (LAN), not illustrated. Interface 14 receives segments of data, known in the art as "packets," from the high-bandwidth source network and communicates them to traffic shaper 12. The packets from the source network are, in general, generated independently or asynchronously, and are intended to be transmitted to destination a network—generally a wide area network (WAN)—having relatively limited bandwidth. Traffic shaper 12 processes the packets and makes them available to the limited-bandwidth network (not illustrated) by way of an OUT interface illustrated as a block 32.

The packets from IN interface 14 of FIG. 1 are applied to an enqueue logic block 16. This enqueue logic contains a bank of filters, the parameters of which have been read by way of a path 17 from the filter/queue/bandwidth (F/Q/B) table 18 at system initialization. Each filter logic may be implemented by a variety of techniques, including regular expressions, bitmasks, or combinations thereof, as known in the art. These logics are designed by the system's operator so that she may apply differential processing to individual packets based on data they contain. Thus, a packet arriving at enqueue logic 16 is applied to each filter sequentially, until it matches one. The packet is marked with the queue number associated with the matching filter by the F/Q/B table 18.

The packets may arrive at enqueue logic block 16 of FIG. 1 and are marked or prioritized by enqueue logic 16. The marked packets are coupled or applied to a multiplexer (MUX) 21. Multiplexer 21 distributes or multiplexes the prioritized data packets to or among the queues 24a, 24b, 24c, ..., 24N of a set 24 of queues based on their classification markings. Thus, for example, the highest-priority messages may be routed to queue 24a, the next-highest priority messages may be routed to queue 24b, ... and the lowest-priority messages may be routed to queue 24N.

The data packets in the various queues of set 24 of queues of FIG. 1 are read from the queues by a dequeue logic arrangement illustrated as a block 26. Dequeue logic arrangement 26 is clocked by way of a path 27 from a clocking logic source 38. The dequeue logic 26 reads from the various queues of set 24 such that the outgoing bit rate from a queue conforms with the bandwidth value given for that queue in the filter/queue/bandwidth (F/Q/B) table 18 and coupled to the dequeue logic 26 by way of a path 25. The dequeued packets are applied from block 26 to any additional optional logic illustrated as a block 30, such as that for routing, compression, or encoding. The packets are then applied to OUT interface block 32 for application to the bandwidth-limited network (not illustrated).

Those skilled in the art know that those queues of set 24 of queues of FIG. 1 which are occupied by higher-priority data or messages are read more often, or for a longer duration, than queues occupied by data or messages of lower priority. This allows all the data or message traffic to flow, but at a rate that can be accommodated by the bandwidth-limited network. The net result of the prior-art arrangement of FIG. 1 is to preferentially advance the processing (passage over the network) of higher-priority data packets at the expense of the less-preferred or lower-priority data packets. Under unfavorable conditions, the queues of the less-preferred data may overflow, with the result of loss of data.

Prior-art traffic shapers such as that of FIG. 1 are effective in limiting traffic rates and guaranteeing resource availability for individual applications under worst-case demand assumptions. Effective deployment of such traffic shapers requires prior knowledge of the network resource requirements of impinging applications, information that can only come from a network engineer. In practice, however, the worst-case scenario seldom develops, and the average resource demand network is less than the worst-case predicts. Thus, network utilization is not maximized in order to guarantee proper operation under worst-case demand.

Improved traffic shaping is desired.

SUMMARY OF THE INVENTION

A method according to an aspect of the invention is for transmitting segments of data, known in the art as "packets," from a source network to a destination network. The method comprises the steps of classifying each packet according to its ability to match a series of filters, and marking each packet with the classification. Each of the packets is applied to a queue of a set of queues in dependence upon the packet's classification. The packets are read from each queue in accordance with a predetermined queue reading policy. The volume of traffic arriving at each queue during N−2n previous time intervals is observed, where n is a system parameter and N is the current time step, to thereby define traffic load history for each queue. From the traffic load history, a matrix $X_j[N]$ is constructed for each queue j={0, ..., M}. The matrix $X_j[N]$ captures the state of the traffic entering the queue. Eigen analysis is performed on the matrix $R_j[N]=(X_j[N])^T(X_j[N])$ to produce a set of vectors $U_j[N]$ that capture the spectral basis of the traffic state. The current traffic state is compared to the traffic state at time k by projecting $X_j[N]$ onto the spectral basis $U_j[k]$ according to the relation $$D(X, U) = \sum_{i=1}^{n}(X_i)^T(X_i) - (X_i)^T(U)(U)^T(X_i)$$

where

X and U are square matrices of size n-by-n;

$X_i$ are the columns of X.

If a previously recorded $U_j[k]$ is found to satisfy the inequality $D_j[N,k] \leq D^*$, where $D_j[N,k]=D(X_j[N],U_j[k])$ and $D^*$ is a system parameter, $b_j[k]$ is made the new queue reading policy for queue j. Otherwise, the current spectral basis $U_j[N]$ and current bandwidth requirement $b_j[N]$ are recorded.

A method according to an aspect of the invention is for prioritizing network traffic to control quality-of-service, where each segment of data ("packet") carries information relating to its priority relative to other segments. The method comprises the steps of observing at least each packet's size and the data it contains, and determining the packet's priority based on the data it contains. The method further includes the step of routing each packet to a queue allocated to the relevant priority. The sizes of all packets and their destination queue numbers are temporarily stored. The volume of data arriving at each queue over a time window is determined and stored. The load spectrum of the incoming traffic is determined for each queue by singular spectrum analysis. The load spectrum is associated with the rate of data arriving at the queue during the time window, and both are stored. The packets are applied to a traffic shaper, which allocates a given portion of the available transmission bandwidth according to a stored policy. This policy is adjusted periodically according to changes in the load spectrum.

According to a further aspect of the invention, a method for transmitting packets of information from a source network comprises the steps of classifying the priority of each packet based the data it contains, and marking each packet with the classification. Each packet is applied to a queue depending upon its marked priority, and each queue is read according to a queue reading policy. The traffic's spectral basis and its associated network bandwidth are calculated to thereby generate a queue/time/eigenvector/bandwidth/control table. The similarity of the current traffic state to the traffic state at time k is given by a distance from the spectral basis (eigenvectors) stored at time k. At each time step, the table is searched for a previously observed traffic state that is sufficiently similar to the current traffic state to determine the expected network bandwidth demand for that queue. The queue reading policy is updated in to meet the expected demand.

BRIEF DESCRIPTION OF THE DRAWING

FIG. 3 is a simplified block diagram of the queue/size (Q/S) table of FIG. 2, showing queue number and packet size;

FIG. 5 is representative of the queue/time/load (Q/T/L) table of FIG. 2;

FIG. 8 is representative of the queue/time/eigenvector/bandwidth/control (Q/T/E/B/C) table of FIG. 2.

DESCRIPTION OF THE INVENTION

Figure 1:
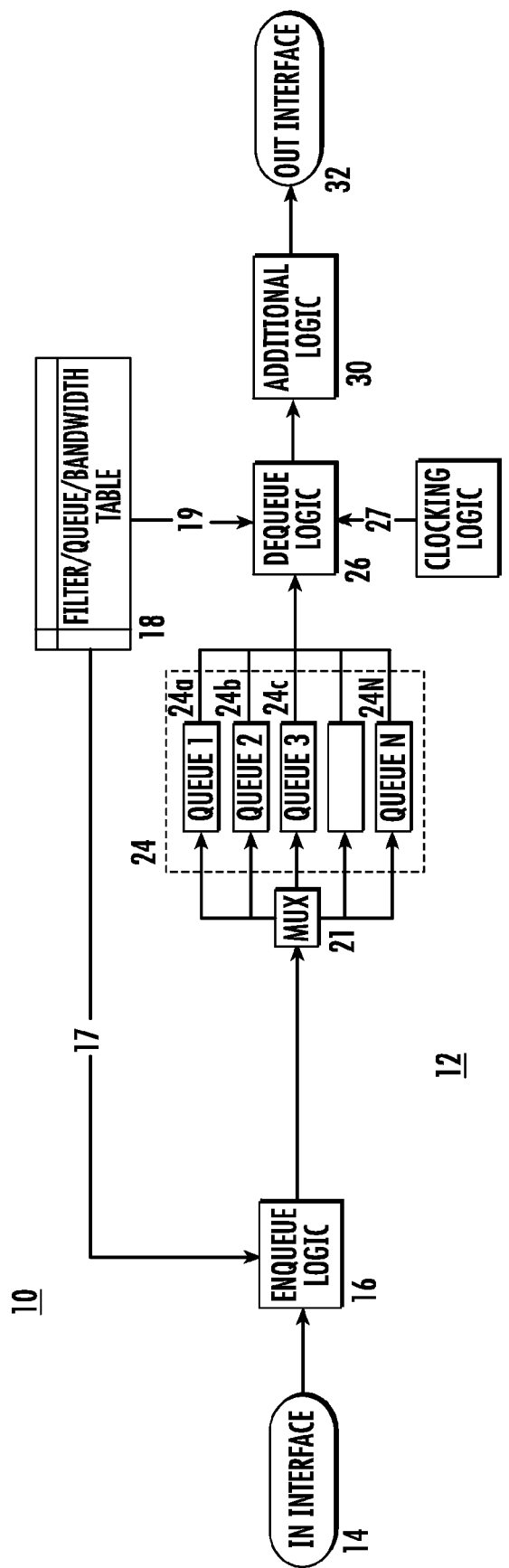
FIG. 1 is a simplified diagram illustrating a prior art network traffic shaper.
Figure 2:
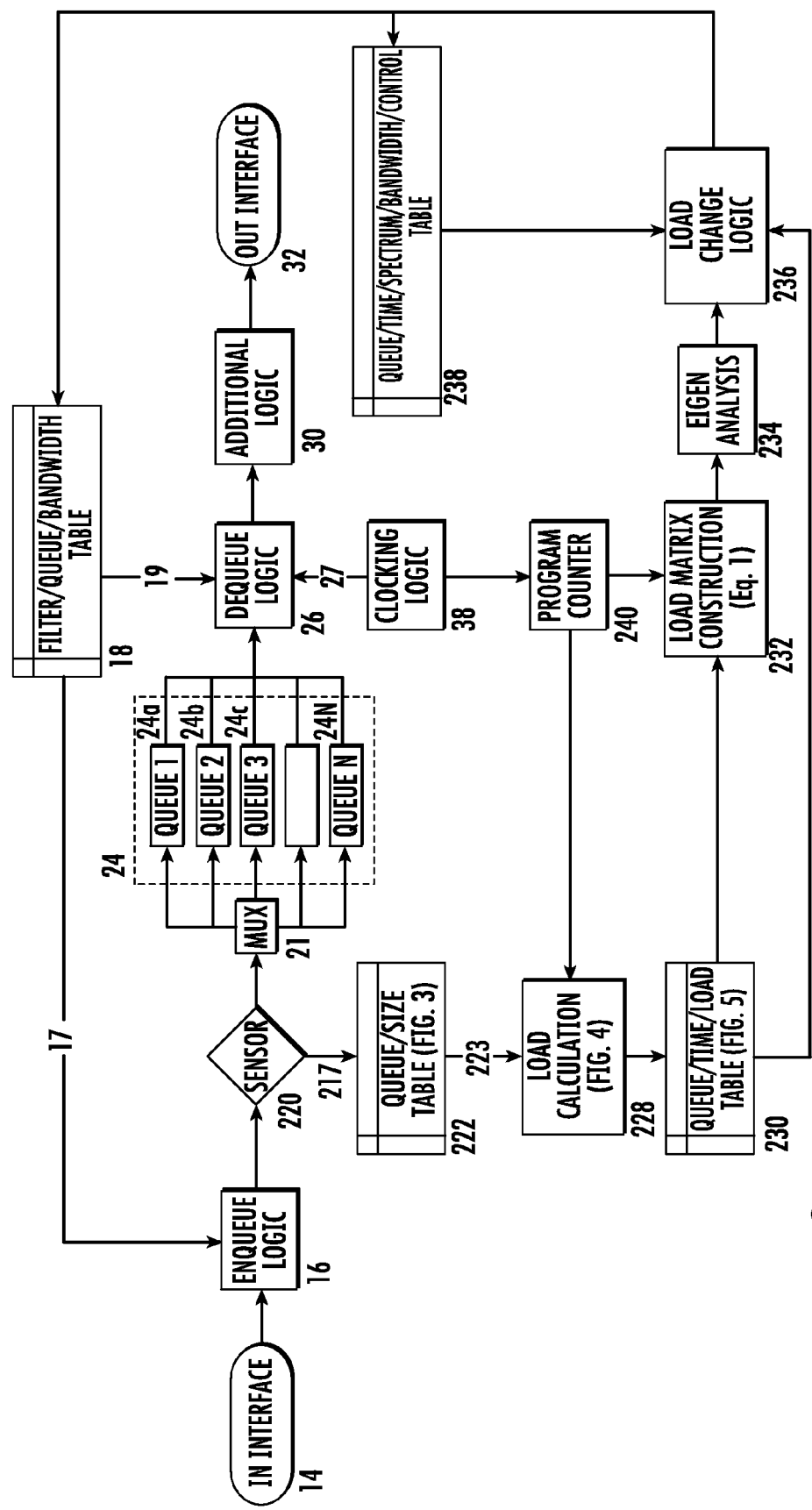
FIG. 2 is a simplified diagram generally similar to that of FIG. 1 including adaptive traffic shaping according to an aspect of the invention, and including a sensor, a queue/size (Q/S) table, a load calculation block, a queue/time/load (Q/T/L) table, a program counter, an eigen analysis block, load change logic, and a queue/time/eigenvector/bandwidth/control (Q/T/E/B/C) table.

FIG. 2 is a simplified diagram of a portion of a network 210 including an adaptive traffic shaper 212 according to an aspect of the invention. Elements of FIG. 2 corresponding to those of FIG. 1 are designated by like reference alphanumerics. In FIG. 2, an IN interface 14 connects to a high-bandwidth network (not illustrated) that is the source of packets bound for a lower-bandwidth network (also not illustrated). The packets from IN interface 14 is/are applied to an input of enqueue logic illustrated as a block 16. Enqueue logic 16 marks the packets with priority information pursuant to the QoS policy embodied in the filter/queue/bandwidth (F/Q/B) table 18. The processing in enqueue logic 16 may be viewed as implementing a set of filters, the properties of which are set by policy information from block 18, and against which the packets are compared, one after another, to determine their destination queue. The queue that is chosen corresponds to the first filter that matches the packet. The packet is marked with this queue number and is passed to a sensor 220. Sensor 220 reads the packet size and the tag applied by the enqueue logic 216. Sensor 220 sends this information by way of a path 217 to a queue/size (Q/S) table illustrated as a block 222 for storage. The packets themselves flow from sensor 220 to a multiplexer (MUX) 21, which routes the packets to the various queues of set 24 of queues in accordance with the marked priority, as known in the art.

The various packets enqueued in the queues of set 24 of FIG. 2 are read or dequeued by dequeue logic illustrated as a block 26. Dequeue logic 26 is clocked by a clock signal applied by way of a path 27 from clocking logic block 38, and selects the queue to be read such that each queue's outgoing bit rate is conformant with the bandwidth associated with it by the F/Q/B table 18. The packets read by dequeue logic block 26 from the various queues of set 24 of queues are applied to any additional logic that may be desired, illustrated as a block 30. From block 30, the dequeued packets finally flow to the OUT interface 32 and toward their destination network.

Simultaneously with the application of the packets from sensor 220 of FIG. 2 to multiplexer 21, the information relating to the packet size and destination queue (whether originally in the packet or added by block 16) is stored in queue/size (Q/S) table 222. The information stored in Q/S table 222 may be viewed as being in the nature of a table 300 similar to that of FIG. 3. The memory information of FIG. 3 includes packet size and destination queue number. In FIG. 3, packet size and queue number (or equivalently the priority) information is stored in corresponding columns of the table, with the data for each packet on a separate row. Information is stored in table 222 on a "window" basis, meaning that the new information is added to the table incrementally, but that the entire table is cleared on some predefined interval. The information from memory 222 of FIG. 2 is made available by way of a path 223 to a load calculation block 228. Load calculation block 228 is activated every N seconds by a program counter block 240.

The program counter block 240 counts clock pulses and activates, first, block 228 and then block 232 at a predefined interval Δt, for example every 2.5 seconds. Any time interval may be used. Blocks 228 and 232 are activated synchronously. That is, block 232 is not activated until block 228 has finished its calculation. Meanwhile, the program counter 240 maintains, in memory, a count of the number of time intervals that have passed since the system was initialized. This number is referred to as "the state of the program counter."

Figure 4:
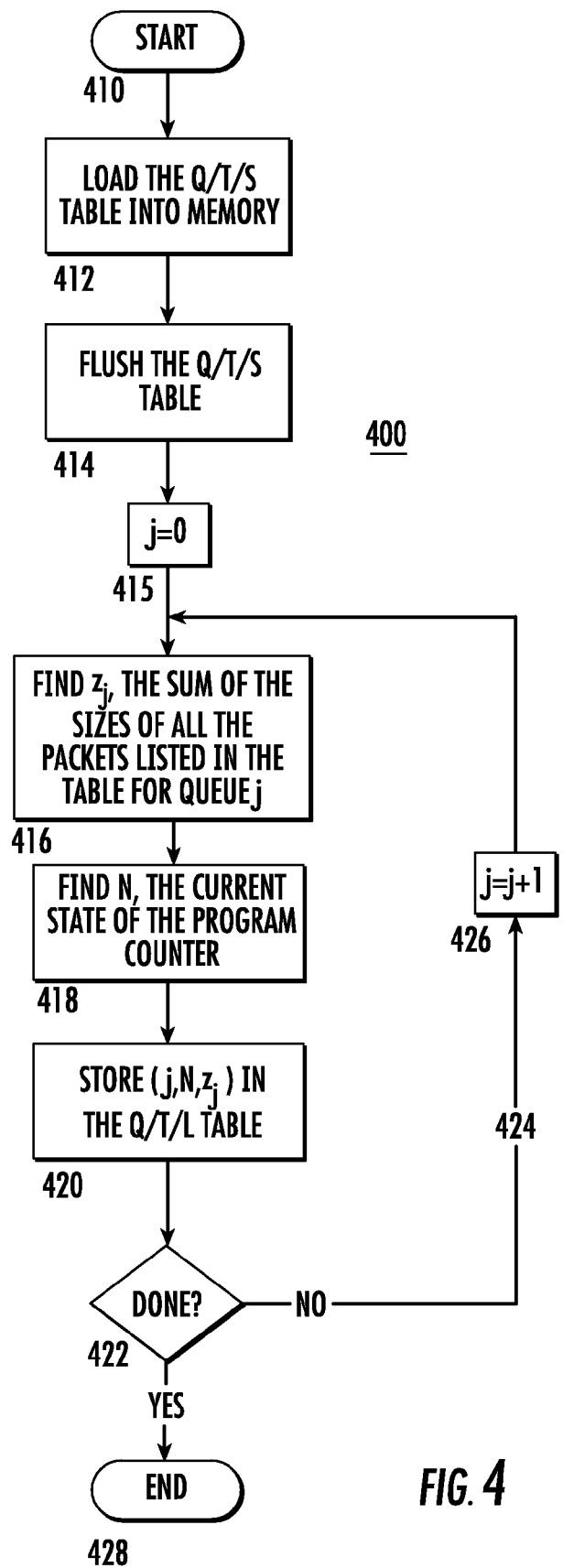
FIG. 4 is a simplified logic flow chart illustrating processing performed in the load calculation block of FIG. 2.

Load calculation block 228 determines the total number of bytes of data arriving at each queue since the last increment of the program counter. Note that "load," as known in the art, is distinct from "bandwidth;" "load" refers to the volume of data, while "bandwidth" refers to its arrival rate. The processing or logic performed in load calculation block 228 of FIG. 2 is illustrated in FIG. 4. As illustrated in FIG. 4, the load determination logic 400 begins at a START block 410, and flows to a block 412, which represents the reading of data from Q/S table 222 into memory, and block 414 represents the clearing of the Q/S table, which allows storage of information about packets which may arrive while the load calculations are performed for the various queues. From block 414, the logic 400 of FIG. 4 flows to a block 415, which sets a queue index j to 0. Block 416 represents the calculation of $z_j$, where $z_j$ is the sum of the sizes of the packets having most recently arrived at the $j^{th}$ queue.

From block 416, the logic of FIG. 4 flows to a block 418, which represents the determination or reading of N, the current state of program counter 240 of FIG. 2. Block 420 of FIG. 4 represents the storing of the current value of N in Q/T/L table 230 of FIG. 2, together with j and $z_j$. A decision block 422 evaluates the current state of the index, and passes control to its NO output if the current index value is less than the maximum index value, which corresponds with the number of queues in set 24 of queues. From the NO output of decision block 416, the logic flows by a logic path 424 to a block 426, which represents the incrementing of queue index j, j=j+1. The logic returns from block 426 to block 416 by way of a path 430. The logic iterates around the loop including blocks 416, 418, and 420 until such time as calculation calculations will have been made for all values of index j, meaning that the calculations have been performed for all queues, and the logic of FIG. 4 leaves decision block 416 by the YES output, indicating completion or END 428 of this set of calculations.

Thus, during operation of the arrangement of FIG. 2, program counter block 240 causes per queue load calculation in load calculation block 228 at every time interval Δt, which can range in duration from milliseconds to seconds. Block 228 recurrently calculates the load values $z_j$ on the packets received within a time window, and stores the values in Q/T/L table 230. The information stored in Q/T/L table 230 may be visualized as being organized in a manner illustrated as 500 in FIG. 5.

Program counter block 240 of FIG. 2 also causes load matrix construction block 232 to be enabled at every time interval Δt. Load matrix construction block 232 reads the Q/T/L table 230, and, for queue j, constructs a matrix $X_j[N]$, passes the matrix $X_j[N]$ to block 234 for eigen analysis, and deletes the oldest set of records from the Q/T/L table. Matrix $X_j[N]$ takes the form $$X_j[N] = \begin{bmatrix} z_j[N] & z_j[N-1] & \cdots & z_j[N-n] \\ z_j[N-1] & z_j[N-2] & \cdots & z_j[N-n-1] \\ \vdots & & \ddots & \vdots \\ z_j[N-n] & z_j[N-n-1] & \cdots & z_j[N-2n] \end{bmatrix} \quad (1)$$

where:
N is the current state of the program counter;
n is the window size, a system parameter; and
$z_j[k]$ is the load of the $j^{th}$ queue at the $k^{th}$ step of the program counter (as stored in the Q/T/L table).

Equation (1) represents the "lag-covariance" matrix, as known to those skilled in the art. This matrix is a time-shifted concatenation of the last 2n+1 entries in the Q/T/L table.

Figure 6:
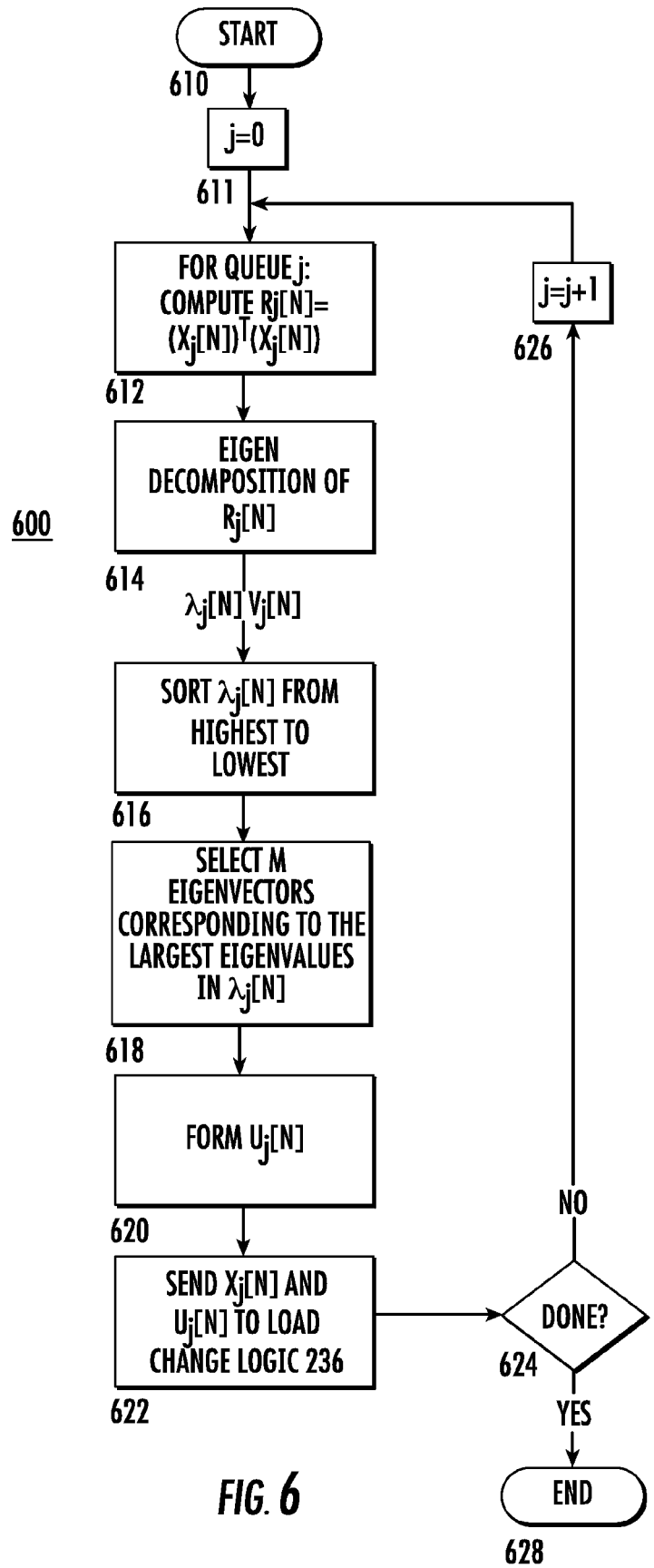
FIG. 6 is a simplified diagram illustrating processing performed in the eigen analysis block of FIG. 2.

When Eigen Analysis block 234 of FIG. 2 receives the current matrix $X_j[N]$ it generates, for queue j, a matrix $$R_j[N] = (X_j[N])^T (X_j[N]) \quad (2)$$

and performs further processing as illustrated in the logic 600 of FIG. 6. The logic 600 of FIG. 6 begins at a START block 610. From START block 610, the logic flows to a block 611, where an index value j that tracks the queue numbers is initialized to 0. The logic then flows to block 612, which represents the generation of Equation (2) for the $j^{th}$ queue. From block 612, the logic flows to a block 614, which represents the performance of eigen decomposition, as known in the art, for matrix $R_j[N]$, to thereby produce a set of eigenvalues $\lambda_j[N]$ and eigenvectors $V_j[N]$ for each matrix. From block 614, the logic 600 flows to a block 616, which represents the sorting of the values of $\lambda_j[N]$ from highest to lowest. Block 618 represents the selection of a number M of eigenvectors $V_j[N]$, which M eigenvectors correspond to the largest of the sorted $\lambda_j[N]$. That is, the largest M of the eigenvalues $\lambda_j[N]$ are selected, and the M corresponding eigenvectors $V_j[N]$ are selected. Block 620 represents the concatenation of these M selected eigenvectors of $V_j[N]$ to produce the matrix $U_j[N]$. Block 622 represents, for the computations performed for the current queue, the sending of $X_j[N]$ and $U_j[N]$ to the load change logic 236 of FIG. 2. From block 624 of FIG. 6, the logic flows to a decision block 624, which represents a comparison of the current value of index j to the maximum value, to determine whether all queues have been evaluated. If queues remain to be evaluated, the logic leaves decision block 624 by the NO output, and flows to an index incrementing function illustrated as a block 626. The incremented index flows back to path 611 to increment the index and to block 612 to start another iteration through the logic. Eventually, all the queues will have been evaluated, and the logic 600 will leave decision block 624 by the YES output, and flow to an END block 628.

Thus, Eigen analysis block 234 of FIG. 2 produces matrix $X_j[N]$ from the load samples {$x_j[N], \ldots, x_j[N-2n]$} and a matrix of $U_j[N]$ of concatenated eigenvectors for traffic entering each queue j=1, . . . , M during the preceding (Nth) interval, as given by the program counter. Matrices $X_j[N]$ and $U_j[N]$ are applied from block 234 to load change analysis block 236.

Figure 7:
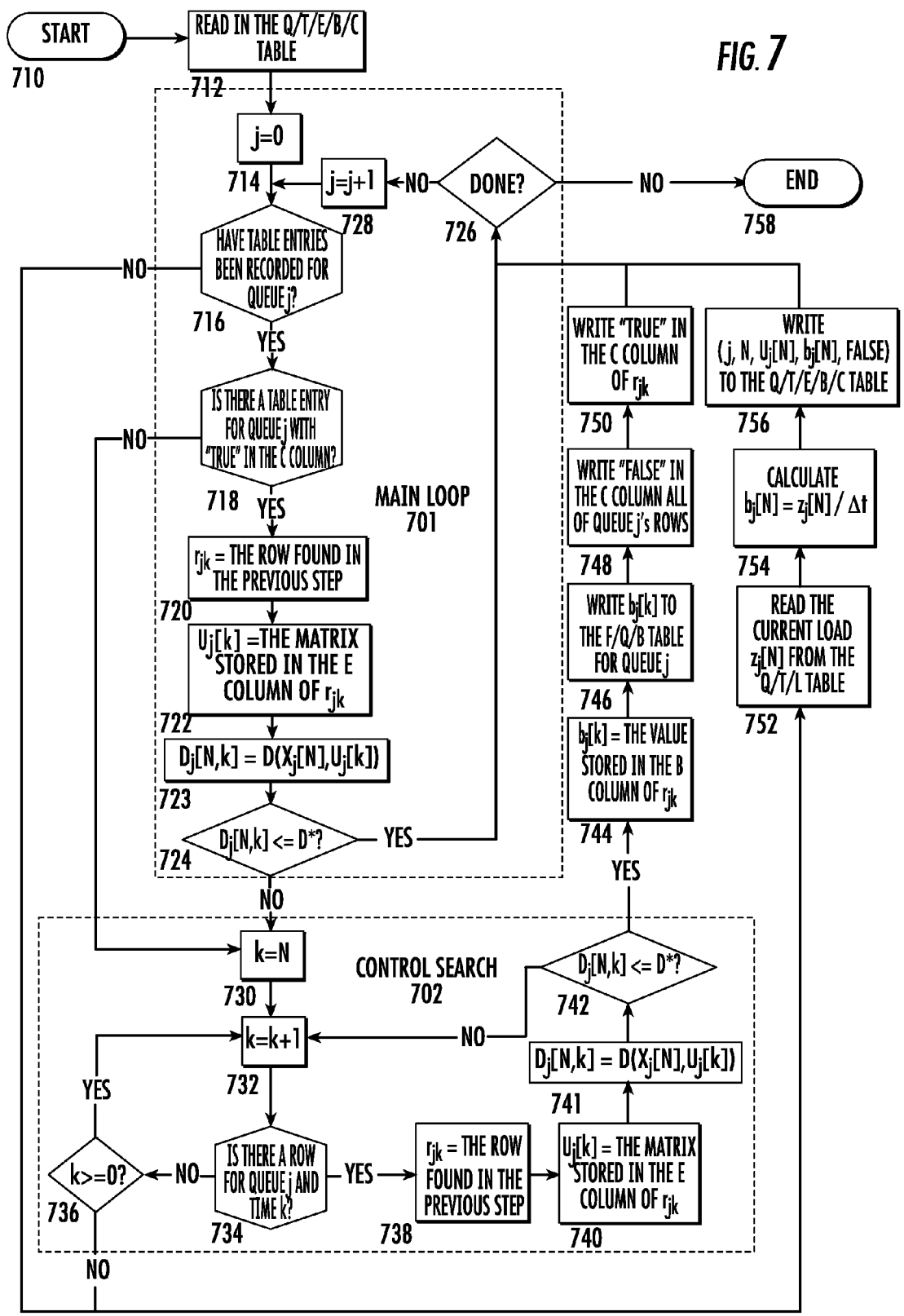
FIG. 7 is a simplified diagram illustrating processing performed in the load change logic of FIG. 2.

FIG. 7 is a simplified flow chart 700 illustrating the processing associated with load change logic block 236 of FIG. 2. The purpose of logic arrangement 700 is to compare the current state of traffic entering each queue to traffic states that have been previously observed, and to adjust the system's queue-reading policy if such an adjustment is supported by previous observations. The "current state of traffic" entering queue j is summarized by the matrices $X_j[N]$ and $U_j[N]$, which are passed in by eigen analysis block 234 of FIG. 2. Previous observations of traffic state are stored in the eigenvector, or "E", column of the Q/T/E/B/C table block 238 of FIG. 2. When the current traffic state is found to be sufficiently similar to a past traffic state, the bandwidth demanded by the past state is applied as a controlling parameter to the queue reading policy embodied by the F/Q/B table block 18 of FIG. 2.

The logic 700 of FIG. 7 includes two important iterating sequences. These are the "main loop" and the "control search." The main loop is embodied by blocks 714 to 728 within dotted-line box 701. Its purpose is to iterate through the queue numbers, determine whether or not we have previously adjusted the queue reading policy, and if we have, to determine if the previously applied control parameter is still appropriate. The appropriateness of the control parameter is determined by comparing the matrix $X_j[N]$ (which is provided by Eigen Analysis block 234 of FIG. 2) to the eigenvector basis stored as $U_j[k]$ according to the distance metric $$D(X, U) = \sum_{i=1}^{n} (X_i)^T(X_i) - (X_i)^T(U)(U)^T(X_i) \qquad (3)$$

where

X and U are square matrices of size n×n; and $X_i$ are the columns of X.

In the event that the policy has not previously been updated for queue j in decision block 720, or the control that was previously applied is no longer valid as determined by decision block 724, the "control search" embodied by blocks 730 to 742 within dotted-line box 702 is initiated. This control search sequence of logic searches the Q/T/E/B/C table for an appropriate control. If an appropriate control is found, it is applied, and the logic returns to the main loop. Otherwise, the Q/T/E/B/C table is merely populated with current traffic state information according to blocks 752, 754, and 756.

More particularly, the logic flow begins at a START block 710 of FIG. 7, and flows to a block 712. In block 712, the Q/T/E/B/C table is read into memory, and then in block 714 a queue-representative index j is set to j=0. From block 714, the logic 700 flows to a decision block 716, which determines if entries in the Q/T/E/B/C table have been recorded for the queue j. If table entries have not been made, the logic leaves by block 716 by its NO output and proceeds to store the load observations for queue j according to blocks 752, 754, and 756. If the table entries have been made, the logic leaves decision block 716 by the YES output, and flows to a decision block 718. Block 718 represents, for the current queue j, the examination of the "C" column of Q/T/E/B/C table (block 238 of FIG. 2) by looking for the value "True" in rows pertaining to queue j. For queue j, if such a row does not exist, logic leaves the decision block 718 by its NO output and a control search is initiated. Otherwise, the logic leaves by its YES output and proceeds to block 720, where it designates the satisfying row "$r_{jk}$". Next, the eigenvector matrix stored in row $r_{jk}$ is designated "$U_j[k]$" according to block 722 of the logic. 700. Given Xj[N] from the input and Uj[k] from block 722, block 723 is able to calculate the function D given by Equation 3. The result of this calculation is designated "$D_j[N,k]$". More precisely, $$D_j[N,k]=D(X_j[N],U_j[k]) \qquad (4)$$

where D(X,U) is given by Equation 3. In decision block 724, $D_j[N,k]$ is compared to a threshold D* (a system parameter) as in Equation (5):

$$D_j[N,k] \leq D \qquad (5)$$

This inequality is evaluated, the logic leaving decision block 724 by either the YES or NO output, according to the result, as known in the art. If the logic leaves by the YES path, this represents the completion of tasks for the current queue j.

If, on the other hand, the logic leaves the decision block by the NO output and flows to a block 730, a "control search" is begun for queue j. Block 730 sets the value of an index k equal to N, where N is the current state of the program counter. Block 732 represents the decrementing of program counter state k to k−1. Decision block 734 determines if there is a row in the Q/T/E/B/C table for queue j and time k. If there is a row entry, the logic leaves decision block 734 by the YES output, and flows to a block 738, designating the satisfying row "$r_{jk}$". Continuing to block 740, the eigenvector matrix associated in the E column of $r_{jk}$ is designated as "$U_j[k]$". Given $X_j[N]$ from the input and $U_j[k]$ from block 740, block 741 is able to calculate the function D according to Equation 3. The result of this calculation is designated "$D_j[N,k]$". In decision block 742, $D_j[N,k]$ is compared to a threshold D* according to Equation (5) If $D_j[N,k]$ is less than or equal to D*, the logic leaves decision block 742 by the NO output, and returns to block 732 to decrement the time k and start another iteration through blocks 734, 738, and 740.

If Equation 5 is satisfied in decision block 750 of FIG. 7, the logic leaves the decision block by the YES output, and flows to a block 744. Block 744 again examines the Q/T/E/B/C table and finds the bandwidth values stored in the B column of $r_{jk}$. The bandwidth may be termed $b_j[k]$. Block 746 represents the writing of $b_j[k]$ to the F/Q/B table (18 of FIG. 2) for queue j. In block 748, the C column of the Q/T/E/B/C table is set to "False" for all rows concerning queue j. Subsequently, in block 750, the C column of $r_{jk}$ is set to "True." From block 750, the logic 700 flows to decision block 726, which represents completion of the current iteration for the current queue value j.

Returning now to the description of decision block 734 of logic 700 of FIG. 7, the logic leaves the decision block by the NO output if there is no entry in the Q/T/E/B/C table for queue j and time k. The logic flows to a further decision block 736 to determine if all the values of time have been evaluated, which is to say if the decrementing values of k have passed the value of zero and become negative. If the value of k is still greater than or equal to zero, the logic leaves decision block 736 by the YES output, and flows to block 732, so that k can be decremented further. On the other hand, if the current value of k has passed zero, decision block 746 routes the logic by way of its NO output to a block 752.

Block 752 of logic 700 of FIG. 7 represents the reading from the Q/T/L table (222 of FIG. 2) of the current value of load $z_j[N]$. Block 754 represents calculation of bandwidth $b_j[N]=z_j[N]/\Delta t$, where $\Delta t$ is the time between increments of the program counter, a system parameter. From block 754, the logic flows to a block 756, which represents the writing of (j, N, $U_j[N]$, $b_j[N]$, False) to the Q/T/E/B/C table (238 of FIG. 2).

The logic 700 of FIG. 7 flows from blocks 724, 750, or 756 to decision block 726 at various stages of the processing. When the logic has been evaluated for all the queues, the main loop exits by way of the YES output of decision block 726 and proceeds to an END block 758, which represents the end of processing for the current loading of the queues 24. The logic then begins again when the program counter is next incremented.

A method according to an aspect of the invention is for transmitting segments of data, known in the art as "packets," from a source network to a destination network. The method comprises the steps of classifying each packet according to its ability to match a series of filters, and marking each packet with the classification (16). Each of the packets is applied to a queue of a set of queues (24) in dependence upon the packet's classification. The packets are read (26) from each queue in accordance with a predetermined queue reading policy (18). The volume of traffic arriving at each queue during N−2n previous time intervals is observed (220, 222), where n is a system parameter and N is the current time step, to thereby define traffic load history (230) for each queue. From the traffic load history, a matrix $X_j[N]$ is constructed (232, Eq. 1) for each queue j={0, . . . , M}. The matrix $X_j[N]$ captures the state of the traffic entering the queue. Eigen analysis (234) is performed on the matrix $R_j[N]=(X_j[N])^T(X_j[N])$ to produce a set of vectors $U_j[N]$ that capture the spectral basis of the traffic state. The current traffic state is compared (236) to the traffic state at time k by projecting $X_j[N]$ onto the spectral basis $U_j[k]$ according to the relation $$D(X, U) = \sum_{i=1}^{n} (X_i)^T(X_i) - (X_i)^T(U)(U)^T(X_i) \qquad (3)$$

where
X and U are square matrices of size n-by-n;
$X_i$ are the columns of X.
If a previously recorded $U_j[k]$ is found to satisfy the inequality $D_j[N,k] \leq D^*$, where $D_j[N,k]=D(X_j[N],U_j[k])$ and $D^*$ is a system parameter, $b_j[k]$ is made the new queue reading policy (18) for queue j. Otherwise, the current spectral basis $U_j[N]$ and current bandwidth requirement $b_j[N]$ are recorded.

A method according to an aspect of the invention is for prioritizing network traffic to control quality-of-service where each segment of data ("packet") carries information that determines its priority relative to other segments. The method comprises the steps of observing (220) at least each packet's size and the data it contains, and determining the packet's priority based on the data it contains. The method further includes the step of routing each packet to a queue (24) allocated to the relevant priority. The sizes of all packets and their destination queue numbers are temporarily stored (222). The volume of data arriving at each queue over a time window is determined (228) and stored (230). The load spectrum of the incoming traffic is determined for each queue by singular spectrum analysis (232, 234). The load spectrum is associated with the rate of data arriving at the queue during the time window, and both are stored. The packets are applied to a traffic shaper (12), which allocates a given portion of the available transmission bandwidth to each queue according to a stored policy (18). This policy is adjusted (236) periodically according to changes in the load spectrum.

According to a further aspect of the invention, a method for transmitting packets of information from a source network comprises the steps of classifying the priority of each packet based on the data it contains (222), and marking each packet with the classification. Each packet is applied to a queue (of a set 24) depending upon its marked priority, and each queue is read (26) according to a queue reading policy (18). The traffic's spectral basis (232,234) and its associated network bandwidth are calculated to thereby generate a queue/time/eigenvector/bandwidth/control table (238). The similarity of the current traffic state to the traffic state at time k is given by a distance (Eq. 4) from the spectral basis (eigenvectors) stored (238) at time k. At each time step, the table (238) is searched for a previously observed traffic state that is sufficiently similar to the current state to determine the expected network bandwidth demand for that queue. The queue reading policy (18) is updated to meet the expected demand.

What is claimed is:

1. A method for transmitting packets of data from a source network to a destination network, said method comprising the steps of:
    classifying each packet accordingly to its ability to match a series of filters, and marking each packet with the classification;
    applying each packet to a queue of a set of queues in dependence upon the packet's classification;
    reading said packets from each queue in accordance with a predetermined queue reading policy;
    observing a volume of traffic arriving at each queue during N−2n previous time intervals to thereby define traffic load history for each queue, where n is a system parameter and N is a current time step;
    from said traffic load history, constructing a matrix $X_j[N]$ for each queue j={0, . . . , M} that captures a state of the traffic entering that queue;
    performing an eigen analysis of the matrix $R_j[N]=(X_j[N])^T(X_j[N])$ to produce a set of vectors $U_j[N]$ that capture a spectral basis of the traffic state;
    comparing a current traffic state to the traffic state at time k by projection $X_j[N]$ onto the spectral bases $U_j[k]$ according to the relation $$D(X, U) = \sum_{i=1}^{n} (X_i)^T(X_i) - (X_i)^T(U)(U)^T(X_i)$$

where
X and U are square matrices of size n-by-n;
$X_i$ are the columns of X;
making a bandwidth $b_j[k]$ a new queue reading policy for queue j if a previously recorded $U_j[k]$ can be found to satisfy the inequality $D_j[N,k] \leq D^*$ where $D_j[N,k]=D(X_j[N][U_j[k])$;
otherwise
recording a current spectral basis $U_j[N]$ and current bandwidth requirement $b_j[N]$.

2. A method for prioritizing network traffic to control quality-of-service where each of a plurality of packets carries information relating to its priority relative to other messages, said method comprising the steps of:
    observing at least packet sizes and data each of the packets contain;
    determining each of the packet's priority based on the data it contains;
    routing each of the packets to one of a plurality of queues allocated to a relevant priority;
    temporarily storing said packet sizes and their destination queue numbers;

determining and storing a volume of data arriving at each of the queues over a time window using the temporarily stored packet sizes and destination queue numbers;

determining a load spectrum of incoming network traffic by singular spectrum analysis using the determined volume of data from each of the queues;

associating the load spectrum with a rate of data arriving at each of the queues over a time window; and applying the packets of said network traffic to a traffic shaper, which allocates a portion of an available transmission bandwidth to each of the queues according to a stored policy.

3. A method according to claim 2, further comprising the step of storing the load spectrum and associated data rate.

4. A method according to claim 2, further comprising the step of:

periodically adjusting the stored policy according to changes in the load spectrum.

5. A method according to claim 2, further comprising the steps of:

periodically adjusting the stored policy according to changes in the load spectrum; and storing the load spectrum and associated data rate.

6. A method for transmitting packets of information from a source network, said method comprising the steps of:

classifying a priority of each of the packets based on data it contains;

marking each of the packets with the classification;

applying each of the packets to one of a plurality of queues depending upon its marked priority;

reading each of the queues according to a queue reading policy;

while said packets are traversing said queues, calculating a traffic spectral basis and associated network bandwidth to generate a queue/time/eigenvector/bandwidth/control table;

finding a similarity of a current traffic state to a traffic state at time k by calculating a distance from the spectral basis at time k;

searching the queue/time/eigenvector/bandwidth/control table for a previously observed traffic state that is similar to the current traffic state to determine an expected network bandwidth demand; and updating the queue reading policy to meet the expected network bandwidth demand.

7. A system for prioritizing network traffic including a plurality of packets, where each of the packets of said network traffic carries information relating to its priority relative to other messages, said system comprising:

a processor executing instructions to perform the steps of:

observing at least packet sizes and data each of the packets contain;

determining each of the packet's priority based on the data it contains;

routing each of the packets to one of a plurality of queues allocated to a relevant priority;

temporarily storing said packet sizes and their destination queue numbers using the temporarily stored packet sizes and destination queue numbers;

determining and storing a volume of data arriving at each of the queues over a time window using the determined volume of data from each of the queues;

determining a load spectrum of incoming network traffic by singular spectrum analysis;

associating the load spectrum with a rate of data arriving at each of the queues over a time window; and applying the packets of said network traffic to a traffic shaper, which allocates a portion of an available transmission bandwidth to each of the queues according to a stored policy.

8. A system according to claim 7, wherein the processor executes instructions to perform the further step of storing the load spectrum and associated data rate.

9. A system according to the claim 7, wherein the processor executes instructions to perform the further step of periodically adjusting the stored policy according to changes in the load spectrum.

10. A system according to claim 7, wherein the processor executes instructions to perform the further step of periodically adjusting the stored policy according to changes in the load spectrum; and storing the load spectrum and associated data rate.

11. A system according to claim 7, further comprising a sensor for reading packet size and queue information and for sending said information to a queue/size table.

12. A system according to claim 11, further comprising a multiplexor for receiving each of the packets from said sensor and for routing each packet to a queue in accordance with a marked priority.

13. A system according to claim 7, wherein the processor executes instructions to perform the further step of comparing a current state of traffic entering each of the queues to traffic states that have been previously observed, and adjusting the stored policy in accordance with said previous observations.

14. A system according to claim 13, wherein said step of adjusting the stored policy is responsive to changes in the load spectrum.

15. A system according to claim 13, wherein said step of adjusting the stored policy is responsive to meet an expected bandwidth demand for an associated queue.

16. A method according to claim 2, comprising the further step of comparing a current state of traffic entering each of the queues to traffic states that have been previously observed, and adjusting the stored policy in accordance with said previous observations.

17. A method according to claim 16, wherein said step of adjusting the stored policy is responsive to changes in the load spectrum.

18. A method according to claim 16, wherein said step of adjusting the stored policy is responsive to meet and expected bandwidth demand for an associated queue.

* * * * *